United States Patent [19]

Beilman

[11] 3,726,139
[45] Apr. 10, 1973

[54] FLUID SPEED INDICATING APPARATUS

[75] Inventor: John L. Beilman, Lancaster, N.Y.

[73] Assignee: Cornell Aeronautical Laboratory, Inc., Buffalo, N.Y.

[22] Filed: Nov. 18, 1970

[21] Appl. No.: 90,552

[52] U.S. Cl. .................................73/181, 73/178 H
[51] Int. Cl. ...........................................G01c 21/10
[58] Field of Search..................73/182, 178 H, 181

[56]  References Cited

UNITED STATES PATENTS

| | | | |
|---|---|---|---|
| 3,332,282 | 7/1967 | Daw | 73/182 |
| 3,400,584 | 9/1968 | Beilman | 73/182 |

Primary Examiner—Donald O. Woodiel
Attorney—Allen J. Jaffe

[57] ABSTRACT

A fluid speed indicating apparatus having one or more rotating arms that are driven by a constant speed motor, each arm having a velocity sensing tip which is located out of the plane of rotation of the arm.

2 Claims, 1 Drawing Figure

PATENTED APR 10 1973  3,726,139
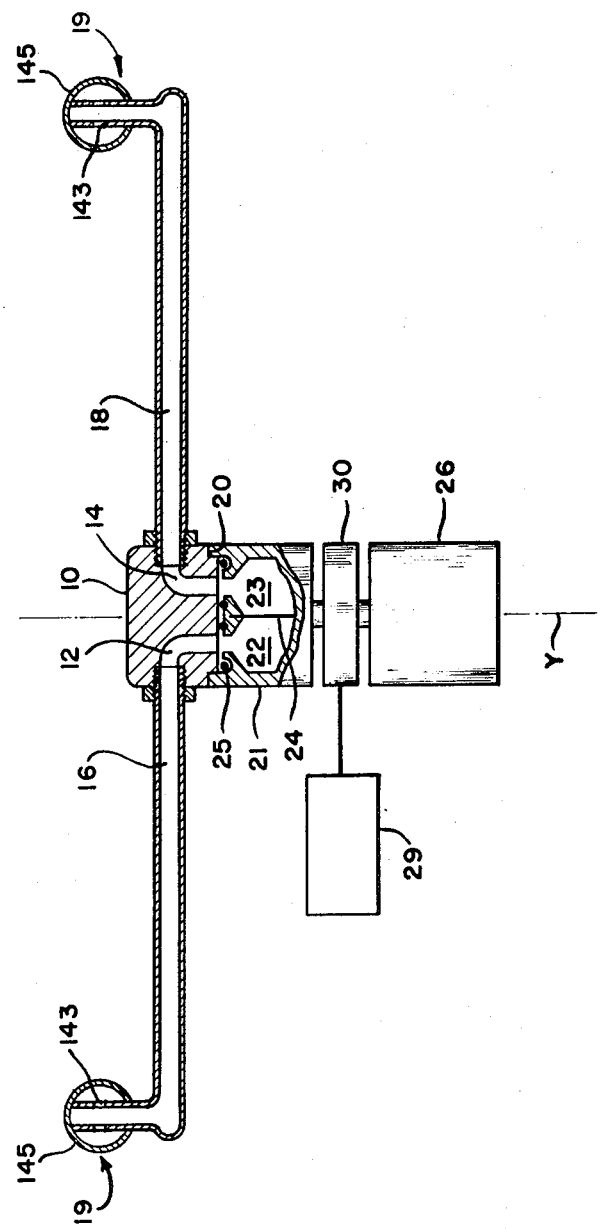
JOHN L. BEILMAN
INVENTOR
BY *Allen J. Doffke*
ATTORNEY

FLUID SPEED INDICATING APPARATUS

BACKGROUND OF THE INVENTION

The present invention relates to airspeed indicators, and more particularly to airspeed indicators that are sensitive to very low airspeeds.

Airspeed indicators are known which are designed to measure the low airspeeds encountered in helicopter or VTOL flights. These indicators comprise one or more rotating pitot tubes, wherein the amplitude of the cyclic variations in pressure sensed by the tube or tubes, as they move into the direction of flight and away therefrom is directly proportional to the forward velocity or airspeed of the aircraft. To develop higher pressure differentials for greater sensitivity at low airspeeds, these types of indicators utilize independent motor means to rotate the tubes. In this manner, the pressures sensed by the tubes are much higher than those that would be developed only by the low airspeed.

Attempts to record or measure airspeeds lower than approximately 5 knots have not been successful with prior devices. Thus, with these prior devices there exists a minimum threshold value of sensitivity.

This inability to measure airspeeds below a minimum threshold value is thought to be due to a radial flow or whirl that is generated by the instrument itself. The prior instrument basically comprises a rotating arm having a pitot tube at the end thereof. The rotating arm generates a flow from above and below the arm center and radially outward along the length of the arm, much like the action of a centrifugal pump. At very low airspeeds, this flow enveloping the pitot tube prevents the tube from sensing the pressures which are generated by the forward speed of the aircraft. At higher speeds this induced flow has not interfered with operation of the instrument or measurement of velocity.

Prior U.S. Pat. Nos. 3,373,605 and 3,400,584, issued on Mar. 19, 1968 and Sept. 10, 1968, respectively, relate to structure in the form of oppositely inclined airfoils mounted on each tube which substantially eliminates the radial flow or whirl produced by the instrument. While this arrangement has functioned satisfactorily, the drag introduced by the airfoils is undesirable because the greater the drag the greater are the power requirements.

SUMMARY OF THE INVENTION

Whereas according to the prior patents referred to above, the whirl or induced flow is substantially eliminated. The present invention presents a configuration whereby the effects of the whirl or induced flow are eliminated without eliminating the whirl or induced flow itself.

It has been found that the whirl or induced flow is greatest in the plane of rotation of the tubes. Accordingly, the present invention incorporates sensing tips located out of the plane of rotation of the tubes or arms.

Basically, then, the present invention provides a fluid speed indicating apparatus, comprising; at least one generally tubular hollow arm mounted for rotation in at least one plane, motor means for rotating said arm at a substantially constant speed, and fluid pressure sensing means attached to an extremity of the arm and located out of the plane or planes in which the arm is contained.

BRIEF DESCRIPTION OF THE DRAWINGS

For a fuller understanding of the invention reference should be had to the following detailed description of the same taken in conjunction with the accompanying drawing wherein the only FIGURE is a partial sectional view of one form of the apparatus.

DESCRIPTION OF THE PREFERRED EMBODIMENT

Referring now to the drawing, the fluid speed sensing instrument comprises a central hub portion 10 in the shape of a disc having elbow-shaped passages 12 and 14 suitable drilled therein. Communicating with the horizontal portion of passage 12 and suitably attached to hub 10 is one end of an elongated substantially straight tubular arm 16 arranged horizontally in substantially a single plane. A second similar arm 18 is suitably attached to hub 10 for communication with passage 14 therein. Arm 18 is diametrically opposed to arm 16. The arms 16 and 18 are rigidly mounted to hub 10 so that no relative movement therebetween is possible.

Each arm 16 and 18 at its extremity, radially outward from hub 10, has attached thereto fluid pressure sensing means generally depicted at 19. As illustrated, pressure sensing means 19 may take the form of those illustrated in FIG. 5 of U.S. Pat. No. 3,400,584 in which ports 143 tangential to the flow sense a static pressure and in which a hollow cylindrical shroud 145 is provided in surrounding relation to the ports 143. Alternatively, the sensor may take the form of pitot tubes as illustrated in FIG. 1 of U.S. Pat. No. 3,400,584 or any other suitable form of sensing means may be utilized. Since the specific type of sensing means forms no part of the present invention, no further description thereof is deemed necessary. It is however, important to note that the sensing means 19 are located out of the plane of the arms 16 and 18 as illustrated.

Suitably attached to the lower end 20 of hub 10 is a transducer unit 21, the input portion of which comprises a pair of chambers 22 and 23 separated by a differential pressure sensing diaphragm 24. Chambers 22 and 23 communicate respectively with the lower vertical ends of passages 12 and 14 and are sealed with respect to each other and the exterior of unit 21 by means of a plurality of O-rings 25. Existence of a difference in pressure between chambers 22 and 23 will cause diaphragm 24 to flex or bend in proportion to the extent of the differential pressure.

Mounted in unit 21 may be any suitable transducer for converting the movement of diaphragm 24 into an electrical signal as, for example, a variable reluctance type pickoff, or simply, a strain gage pickoff.

Provided below hub 10 and transducer unit 21 is a motor unit 26 for rotating at a substantially constant speed unit 21, hub 10 and arms 16 and 18 about vertical axis Y. The electrical signal output of transducer unit 21 is conveyed to the electronic portion of the apparatus shown in block form at 29 by means of a slip-ring and brush assembly 30. Since the electronic unit is adequately described in U.S. Pat. No. 3,400,584 and forms no part of the present invention no further description thereof is necessary.

In operation, the fluid speed indicating apparatus may be mounted on an aircraft to measure the airspeed thereof or it may be used as an anemometer to measure wind velocities or it may be utilized to measure water speed on a ship or submarine. Regardless of the particular application the unit functions as described in U.S. Pat. No. 3,400,584 to sense the cyclic pressure variations at ports 143 due to alternate movement of arms 16 and 18 into and out of the direction of relative fluid flow.

As pointed out in U.S. Pat. No. 3,400,584 the rotation of arms 16 and 18 generates a centrifugal flow in the plane of the arms radially outwardly along the surface the arms to the extremities thereof. Since according to the present invention the sensing means 19 are located out of the plane of the arms this centrifugal flow has no effect on the accuracy of the pressure pick-up.

Changes will occur to those skilled in the art; it is therefore intended that the present invention be limited by the scope of the appended claims.

I claim:
1. A fluid speed indicating apparatus, comprising;
   a. at least one generally tubular, hollow arm mounted for rotation in at least one plane,
   b. motor means for rotating said arm at a substantially constant speed,
   c. fluid pressure sensing means attached to an extremity of said arm and located out of the plane or planes in which said arm is contained, and
   d. said fluid pressure sensing means comprises at least one static pressure sensing port surrounded by a cylindrical shroud.
2. The apparatus according to claim 1, further comprising;
   e. a second generally tubular, hollow arm diametrically opposed to said first mentioned arm, and
   f. fluid pressure sensing means attached to an extremity of said second arm and located out of the plane or planes in which said second arm is contained.

* * * * *